US012474902B2

(12) United States Patent
Gallagher et al.

(10) Patent No.: US 12,474,902 B2
(45) Date of Patent: Nov. 18, 2025

(54) ANNOTATION DRIVEN JUST IN TIME AND STATE-BASED RBAC POLICY CONTROL

(71) Applicant: Red Hat, Inc., Raleigh, NC (US)

(72) Inventors: Brian Gallagher, Waterford (IE); Cathal O'Connor, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 198 days.

(21) Appl. No.: 17/950,577

(22) Filed: Sep. 22, 2022

(65) Prior Publication Data

US 2024/0103818 A1    Mar. 28, 2024

(51) Int. Cl.
    *G06F 9/44*     (2018.01)
    *G06F 8/41*     (2018.01)
    *G06F 8/60*     (2018.01)
    *G06F 21/44*    (2013.01)

(52) U.S. Cl.
    CPC ............ *G06F 8/41* (2013.01); *G06F 8/60* (2013.01); *G06F 21/44* (2013.01)

(58) Field of Classification Search
    CPC ............ G06F 8/41; G06F 8/60; G06F 21/44
    See application file for complete search history.

(56) References Cited

U.S. PATENT DOCUMENTS

| | | | |
|---|---|---|---|
| 10,303,466 B1 * | 5/2019 | Karman | G06F 8/73 |
| 10,447,682 B1 * | 10/2019 | Du Lac | H04L 9/3247 |
| 11,297,066 B2 | 4/2022 | Wei et al. | |
| 2008/0174426 A1 * | 7/2008 | Hackworth | G06F 3/0644 |
| | | | 700/89 |
| 2009/0025063 A1 | 1/2009 | Thomas | |
| 2014/0188815 A1 * | 7/2014 | Mentz | G06Q 10/06 |
| | | | 707/689 |
| 2014/0298481 A1 * | 10/2014 | Gilroy | G06F 21/604 |
| | | | 726/27 |
| 2018/0039775 A1 * | 2/2018 | Poiesz | G06F 9/468 |
| 2018/0316676 A1 | 11/2018 | Gilpin et al. | |
| 2019/0245893 A1 * | 8/2019 | Hopkins | H04L 63/20 |
| 2019/0377574 A1 * | 12/2019 | Weimer | G06F 9/3004 |
| 2021/0136115 A1 * | 5/2021 | Andrews | H04L 63/1433 |

(Continued)

OTHER PUBLICATIONS

Rhoney Benigno et al., "Annotation-based Access Control Approach for Ubiquitous Systems", 2014 IEEE 28th International Conference on Advanced Information Networking and Applications, May 13, 2014, pp. 218-225.

(Continued)

*Primary Examiner* — Bradley A Teets
*Assistant Examiner* — Lenin Paulino
(74) *Attorney, Agent, or Firm* — Womble Bond Dickinson (US) LLP (57) ABSTRACT

Systems and methods for implementing an annotation driven just in time and state-based RBAC policy control are disclosed. The method inserts an annotation into a code base that includes a function. The annotation identifies a resource corresponding to the function. The method compiles the code base into compiled code, which includes inserting, based on the annotation, a first request prior to the function that requests permission to access the resource; and inserting, based on the annotation, a second request subsequent to the function to turn off permission to access the resource. The method then deploys the compiled code to a target environment.

14 Claims, 6 Drawing Sheets

(56) References Cited

U.S. PATENT DOCUMENTS

2022/0012045 A1\* 1/2022 Rudraraju ................. G06F 8/36
2023/0060916 A1\* 3/2023 Wagner ................. H04L 9/0891

OTHER PUBLICATIONS

Paolo Bottoni et al., "Annotation processes for flexible management of contextual information", Journal of Visual Languages and Computing, 24(6), Aug. 30, 2013, pp. 421-440.

Gustaf Neumann et al., "An Approach to Engineer and Enforce Context Constraints in an RBAC Environment", SACMAT '03: Proceedings of the eighth ACM symposium on Access control models and technologies, Jun. 2003, pp. 65-79.

Barsha Mitra et al., "Migrating from RBAC to temporal RBAC", IET Information Security, 11(5), Sep. 1, 2017, pp. 294-300.

Song-Hwa Chae et al., "uT-RBAC: Ubiquitous Role-Based Access Control Model", IEICE Transactions on Fundamentals of Electronics, Communications and Computer Sciences, E89-A, Jan. 2006, pp. 238-239.

Gunjan Batra et al., "Deploying ABAC policies using RBAC systems", Journal of Computer Security, 27(4), Jul. 18, 2019, pp. 483-506.

\* cited by examiner

ANNOTATION DRIVEN JUST IN TIME AND STATE-BASED RBAC POLICY CONTROL

TECHNICAL FIELD

Aspects of the present disclosure relate to role based access control (RBAC), and more particularly, to systems and methods of an annotation driven just in time and state-based RBAC policy control.

BACKGROUND

RBAC provides a security mechanism in which roles and/or attributes are defined for users, groups of users, devices, services, etc. The roles and attributes are then used to define access policies to data, files, services, and other computing resources. Using RBAC, policy sets can be defined for access to individual resources such that only users, devices, or services that are assigned certain roles or attributes have permissions to access the resources (e.g., read, write, modify).

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

The conventional system implements RBAC by using a security principle of "least privilege." Least privilege allows a user to have just the amount of privilege that is necessary to perform a job. Users typically have enough privilege to use their applications, check the status of their jobs, print files, create new files, and so on. In other words, the least privilege security principle allows a user to be given only those privileges needed for it to complete its task.

An application is typically designed with a least privilege security principle. The privileges, however, are given on application startup and permitted throughout the entirety of the application's execution. As such, a resource being requested by the application will accept the request from the application at all times and in all contexts while the application executes, despite the application only potentially needing certain privileges at very specific times or contexts during execution. In turn, the resource is exposed to nefarious use at times and in contexts which may not be necessary and generally increases the resource attack surface and opportunity. Thus, the RBAC least privileged security principle implemented by the conventional system provides an application with privileges at startup and for the entirety of its execution, even though an application only requires the privileges at particular times or contexts.

The present disclosure addresses the above-noted and other deficiencies by further restricting least privilege states by adding a "permission wrapper" around functions to turn on/off permissions during the runtime execution of an application. In some embodiments, annotations and corresponding permission wrappers include time-based criteria and/or state-based criteria.

In some embodiments, a processing device inserts an annotation into a code base that includes a function. The annotation identifies a resource corresponding to the function. The processing device then compiles the code base into compiled code. During the compilation, the processing device inserts, based on the annotation, a request prior to the function that requests permission to access the resource and another request subsequent to the function to turn off permission to access the resource. In turn, the processing device deploys the compiled code to a target environment. The combination of the request to turn on permissions and turn off permissions is referred to herein as the permission wrapper.

In some embodiments, the compiled code is deployed to the target environment as a container. In some embodiments, the container executes the compiled code and sends a request to a trusted controller to request permission for the container to access the resource. The container then executes the function at the resource. Then, after executing the function at the resource, the container sends a request to the trusted controller to turn off permission for the container to access the resource.

In some embodiments, when the trusted controller receives a request to turn on permissions, the trusted controller formats a policy request based on a plug-in corresponding to the resource and sends the policy request to the resource to turn on permission for the container to access the resource. When the trusted controller receives a request to turn off permissions, the trusted controller formats a policy request based on the plug-in corresponding to the resource and sends the policy request to the resource to turn off permission for the container to access the resource. In some embodiments, the plug-in is modified based on a resource policy change, and the trusted controller formats the policy requests based on the modified plug-in.

In some embodiments, when the trusted controller receives a request that includes a state-based policy, the trusted controller analyzes the state-based policy against one or more conditions corresponding to the container and the resource. The trusted controller then inhibits a policy request to request permission for the container to access the resource based on the analysis.

In some embodiments, when the trusted controller receives a request that includes a time-based policy, the trusted controller compares the time-based policy against a current time. The trusted controller then inhibits a policy request to request permission for the container to access the resource based on the analysis.

In some embodiments, the trusted controller creates a historical usage pattern based on historical activity between the container and the resource. The trusted controller then compares the historical usage pattern against a current usage pattern of activity between the container and the resource. The trusted controller then generates an alert based on the comparison indicating that a difference between the current activity pattern and the historical usage pattern exceeds a threshold.

By turning on permissions just prior to requiring a resource and turning off the permissions just after the resource is utilized, the present disclosure minimizes the resource being exposed to nefarious use and therefore increases computer hardware system security and efficiency.

Figure 1:
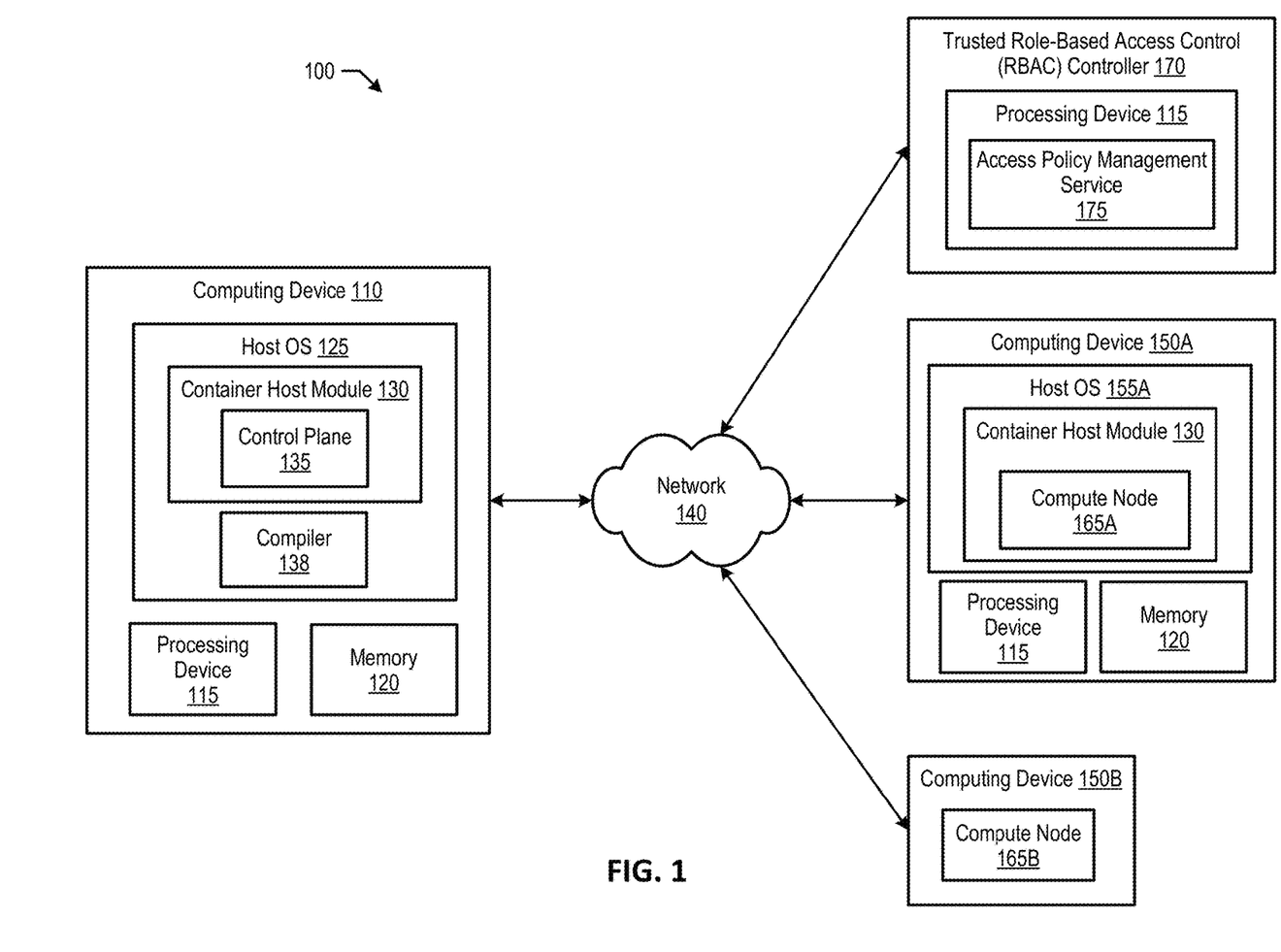
FIG. 1 is a block diagram that illustrates an example system, in accordance with some embodiments of the present disclosure.

FIG. 1 is a block diagram that illustrates an example system 100, in accordance with some embodiments of the present disclosure. As illustrated in FIG. 1, system 100 includes a computing device 110, and a plurality of computing devices 150. The computing devices 110 and 150 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In some embodiments, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. In some embodiments, the network 140 may be an L3 network. The network 140 may carry communications (e.g., data, message, packets, frames, etc.) between computing device 110 and computing devices 150. Each of computing devices 110 and 150 may include hardware such as processing device 115 (e.g., processors, central processing units (CPUs)), memory 120 (e.g., random access memory 120 (e.g., RAM)), storage devices (e.g., hard-disk drive (HDD), solid-state drive (SSD), etc.), and other hardware devices (e.g., sound card, video card, etc.). In some embodiments, memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 110. Each computing device may include any suitable type of computing device or machine that has a programmable processor including, for example, server computers, desktop computers, laptop computers, tablet computers, smartphones, set-top boxes, etc. In some examples, each of the computing devices 110 and 150 may include a single machine or may include multiple interconnected machines (e.g., multiple servers configured in a cluster). The computing devices 110 and 150 may be implemented by a common entity/organization or may be implemented by different entities/organizations. For example, computing device 110 may be operated by a first company/corporation and one or more computing devices 150 may be operated by a second company/corporation. Each of computing device 110 and computing devices 150 may execute or include an operating system (OS) such as host OS 125 and host OS 155 respectively, as discussed in more detail below. The host OS of a computing devices 110 and 150 may manage the execution of other components (e.g., software, applications, etc.) and/or may manage access to the hardware (e.g., processors, memory, storage devices etc.) of the computing device. In some embodiments, computing device 110 may implement a control plane (e.g., as part of a container orchestration engine) while computing devices 150 may each implement a compute node (e.g., as part of the container orchestration engine).

In some embodiments, a container orchestration engine 130 (referred to herein as container host 130), such as the Redhat™ OpenShift™ module, may execute on the host OS 125 of computing device 110 and the host OS 155 of computing device 150, as discussed in further detail herein. The container host module 130 may be a platform for developing and running containerized applications and may allow applications and the data centers that support them to expand from just a few machines and applications to thousands of machines that serve millions of clients. Container host 130 may provide an image-based deployment module for creating containers and may store one or more image files for creating container instances. Many application instances can be running in containers on a single host without visibility into each other's processes, files, network, and so on. Each container may provide a single function (often called a "micro-service") or component of an application, such as a web server or a database, though containers can be used for arbitrary workloads. In this way, the container host 130 provides a function-based architecture of smaller, decoupled units that work together. In some embodiments, computing device 150 may execute on an operational cloud. Compiler 138 may also execute on host OS 125. When a user inserts an annotation into a code base, in accordance with some embodiments, compiler 138 detects the annotation and inserts a permission wrapper around corresponding methods in the compiled code.

Container host 130 may include a storage driver (not shown), such as OverlayFS, to manage the contents of an image file including the read only and writable layers of the image file. The storage driver may be a type of union file system which allows a developer to overlay one file system on top of another. Changes may be recorded in the upper file system, while the lower file system (base image) remains unmodified. In this way, multiple containers may share a file-system image where the base image is read-only media.

An image file may be stored by the container host 130 or a registry server. In some embodiments, the image file may include one or more base layers. An image file may be shared by multiple containers. When the container host 130 creates a new container, it may add a new writable (e.g., in-memory) layer on top of the underlying base layers. However, the underlying image file remains unchanged. Base layers may define the runtime environment as well as the packages and utilities necessary for a containerized application to run. Thus, the base layers of an image file may each include static snapshots of the container's configuration and may be read-only layers that are never modified. Any changes (e.g., data to be written by the application running on the container) may be implemented in subsequent (upper) layers such as in-memory layer. Changes made in the in-memory layer may be saved by creating a new layered image.

While the container image is the basic unit containers may be deployed from, the basic units that the container host 130 may work with are called pods. A pod may refer to one or more containers deployed together on a single host, and the smallest compute unit that can be defined, deployed, and managed. Each pod is allocated its own internal IP address, and therefore may own its entire port space. Containers within pods may share their local storage and networking. In some embodiments, pods have a lifecycle in which they are defined, they are assigned to run on a node, and they run until their container(s) exit or they are removed based on their policy and exit code. Although a pod may contain more than one container, the pod is the single unit that a user may deploy, scale, and manage. The control plane 135 of the container host 130 may include replication controllers (not shown) that indicate how many pod replicas are required to run at a time and may be used to automatically scale an application to adapt to its current demand.

By their nature, containerized applications are separated from the operating systems where they run and, by extension, their users. The control plane 135 may expose applications to internal and external networks by defining network policies that control communication with containerized applications (e.g., incoming HTTP or HTTPS requests for services).

A typical deployment of the container host 130 may include a control plane 135 and a cluster of compute nodes 165, including compute nodes 165A and 165B (also referred to as compute machines). The control plane 135 may include REST APIs which expose objects as well as controllers which read APIs, apply changes to objects, and report status or write back to objects. The control plane 135 manages workloads on the compute nodes 165 and also executes services that are required to control the compute nodes 165. For example, the control plane 135 may run an API server that validates and configures the data for pods, services, and replication controllers as well as provides a focal point for the cluster 165's shared state. The control plane 135 may also manage the logical aspects of networking and virtual networks. The control plane 135 may further provide a clustered key-value store (not shown) that stores the cluster 165's shared state. The control plane 135 may also monitor the clustered key-value store for changes to objects such as replication, namespace, and service account controller objects, and then enforce the specified state.

The cluster of compute nodes 165 are where the actual workloads requested by users run and are managed. The compute nodes 165 advertise their capacity and a scheduler (not shown), which is part of the control plane 135, determines which compute nodes 165 containers and pods will be started on. Each compute node 165 includes functionality to accept and fulfill requests for running and stopping container workloads, and a service proxy, which manages communication for pods across compute nodes 165. A compute node 165 may be implemented as a virtual server, logical container, or GPU, for example.

System 100 also includes trusted role-based access control (RBAC) controller 170. Trusted RBAC controller 170 may be a server, a mainframe, a workstation, a personal computer (PC), a mobile phone, a palm-sized computing device, etc. In some embodiments, trusted RBAC controller 170 may be separate computing devices. In some embodiments, trusted RBAC controller 170 may be implemented by a single computing device. For clarity, some components of trusted RBAC controller 170 are not shown.

In some embodiments, processing device 115 of trusted RBAC controller 170 may execute access policy management service 175. The trusted RBAC controller 170 may manage service and device access to resources of a device and/or network, in accordance with some embodiments.

Trusted RBAC controller 170 may include policies to manage service or device access to any other service, device, or other resource of the computing system (e.g., network, device, etc.) managed by the trusted RBAC controller 170, in accordance with some embodiments.

Figure 2:
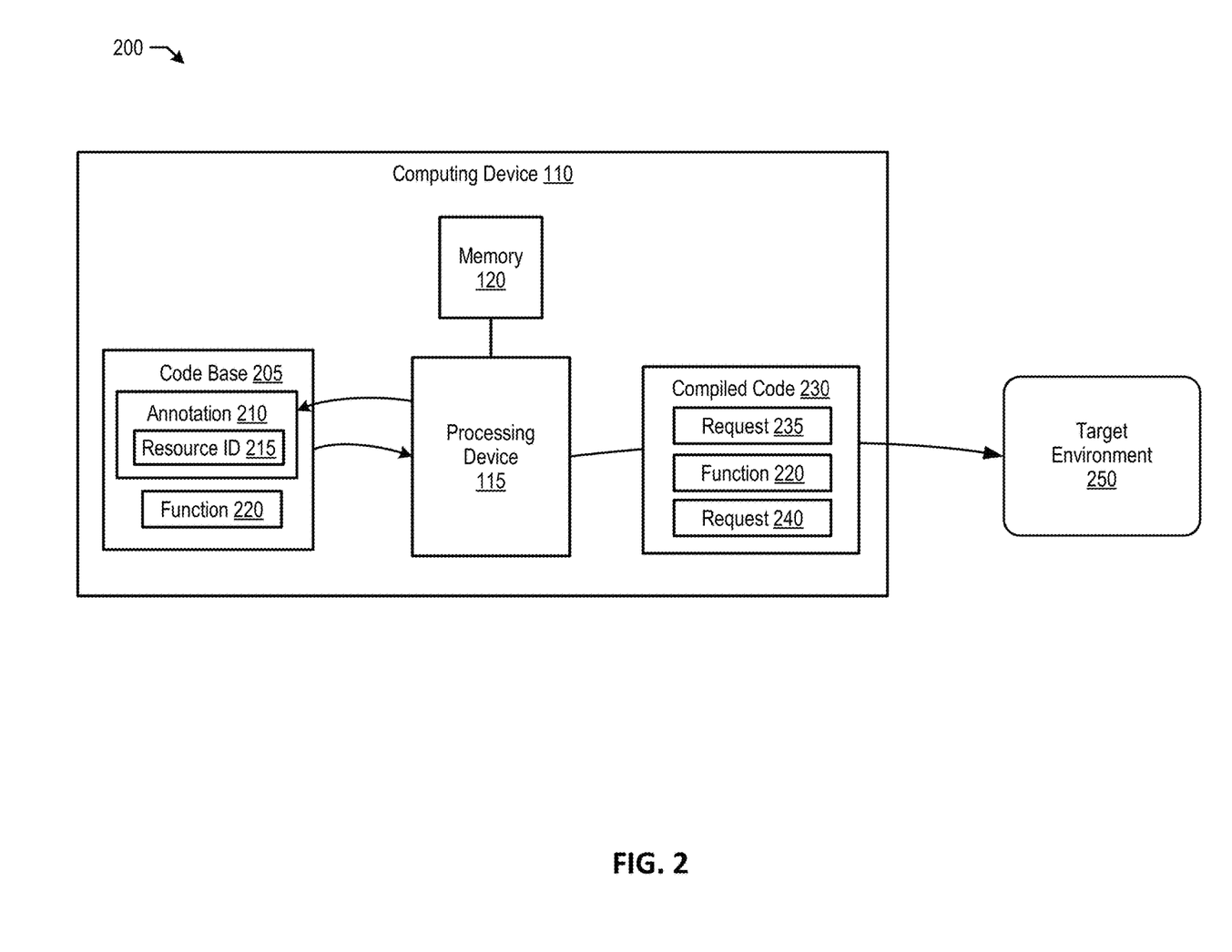
FIG. 2 is an illustration of an example of a computer system inserting an annotation into a code base, which is compiled and deployed to a target environment, in accordance with some embodiments of the present disclosure.

FIG. 2 is an illustration of an example of a computer system inserting an annotation into a code base, which is compiled and deployed to a target environment, in accordance with some embodiments of the present disclosure. System 200 shows processing device 115 adding annotation 210 to code base 205. Annotation 210 includes an identifier of a resource utilized by function 220 (see FIG. 4A and corresponding text for further details).

Processing device 115 compiles code base 205, such as by using compiler 138, and generates compiled code 230. Compiled code 230 includes request 235, which is inserted prior to function 220, to turn on permissions at a resource for function 220 to access. Compiled code 230 also includes request 240 after function 220, to turn off permissions at the resource after function 220 has utilized the resource. In turn, processing device 115 deploys compiled code 230 to target environment. In some embodiments, compiled code is deployed as a container, which executes in target environment (see FIG. 3 and corresponding text for further details).

Figure 3:
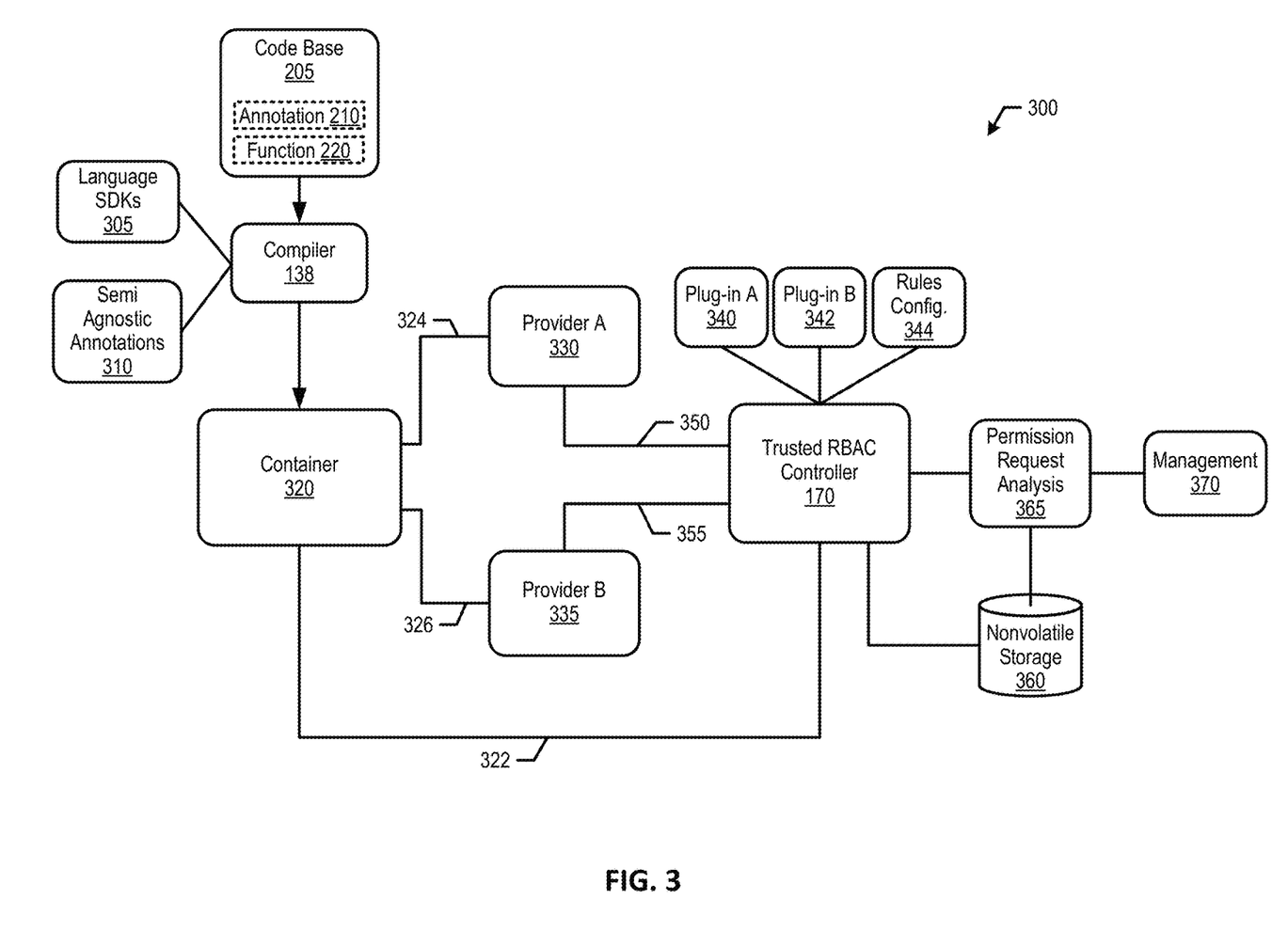
FIG. 3 is an illustration of an example of a computer system architecture for access policy management using a just in time annotation driven role based access control (RBAC) system, in accordance with some embodiments of the present disclosure.

FIG. 3 is an illustration of an example of a computer system architecture for access policy management using an annotation driven just in time and state-based RBAC policy control, in accordance with some embodiments of the present disclosure.

System 300 includes code base 205, compiler 138, container 320, provider A 330, provider B 335, trusted RBAC controller 170, and permission request analysis 365. Code base 205, such as source code, includes annotation 210 and function 220. Annotation 210 is inserted into code base 205 by a developer to limit permissions of executing function 220. Annotation 210 identifies a resource for which function 220 will utilize at runtime. In some embodiments, annotation 210 includes time-based criteria or state-based criteria (see FIGS. 4C and 4D and corresponding text for further details).

Compiler 138 compiles code base 205 and utilizes language SDKs 305 and semi-agnostic annotations 310 to generate compiled code, which is deployed as container 320. Language SDKs 305 and semi-agnostic annotations 310 provide compiler 138 with multi-language support (e.g., syntactical differences) and requires a minimal learning curve for developers. In some embodiments, annotation 210 is provider agnostic and the complexity of policy creation is abstracted to a central controller (trusted RBAC controller 170). Container 320 includes a "permission wrapper" that turns on permissions to perform function 220, and turns off permissions after function 220 completes (see FIG. 4B and corresponding text for further details).

When container 320 executes, container 320 sends permission request 322 to trusted RBAC controller 170 to turn on permissions to provider A 330. Trusted RBAC controller 170 uses rules configuration 344 and plug-in A 340 to build a policy request 350 to send to provider A 330 to turn on permission for container 320 to access. Rule configuration 344 may also identify time-based rules and state-based rules that correspond to time-based criteria and state-based criteria in permission request 322. Container 320 then executes function 220 and performs action 324 at provider A 330. Once action 324 completes, container 320 sends another permission request 322 to trusted RBAC controller 170 to turn off permissions. Trusted RBAC controller 170 uses plug-in A 340 to build another policy request 350 to send to provider A 330 to turn off permission for container 320 to access.

Likewise, when annotation 210 corresponds to provider B 335, container 320 sends permission request 322 to trusted RBAC controller 170 to turn on permissions to provider B 335. Trusted RBAC controller 170 uses rules configuration 344 and plug-in B 342 to build a policy request 355 to send to provider B 335 to turn on permission for container 320 to access. Container 320 then executes function 220 and performs action 326 at provider B 335. Once action 326 completes, container 320 sends another permission request 322 to trusted RBAC controller 170 to turn off permissions. Trusted RBAC controller 170 uses plug-in B 342 to build another policy request 355 to send to provider B 335 to turn off permission for container 320 to access.

In some embodiments, as discussed above, annotation 210 includes time-based policies or state-based policies. In these embodiments, compiler 138 adds the time-based policies or state-based policies to the permission requests 322, which trusted RBAC controller 170 analyzes to determine whether to build policy requests 350 or 355. For example, container 320 may send a permission request 322 to trusted RBAC controller 170 that includes a time-based policy indicating that permission should only be granted on the weekend. In this example, trusted RBAC controller 170 accesses rules configuration 344 and determines whether the current time is on the weekend and, if not, trusted RBAC controller 170 inhibits building the corresponding policies.

In some embodiments, trusted RBAC controller 170 is a reusable service that is usable by all services in a bounded context. For example, several microservices, containers, etc. running in Kubernetes would all use a single trusted RBAC controller 170 to abstract the complexities of integrating with the various providers A 330 and B 335.

In some embodiments, trusted RBAC controller 170 monitors usage patterns of container 320 to determine whether container 320 may be performing unusual activity. Trusted RBAC controller 170 receives permission requests 322 from container 320 and stores the request as logged request in nonvolatile storage 360. At times, trusted RBAC controller 170 will send a usage pattern verification message to permission request analysis 365 to analyze current usage patterns of container 320 with the historical logged requests stored in nonvolatile storage 360. For example, container 320 may access provider A 330 once per day on a regular basis, but suddenly request access to provider A 330 every hour. When permission request analysis 365 detects an anomaly, permission request analysis 365 sends an anomalies report to management 370 that, in some embodiments, identifies the container 320, provider A 330, and any unusual activity. For example, a container may create a database on startup, then consume that database, and may never need to create a subsequent database. In this example, additional requests for permissions could indicate unusual activity.

Figure 4A:
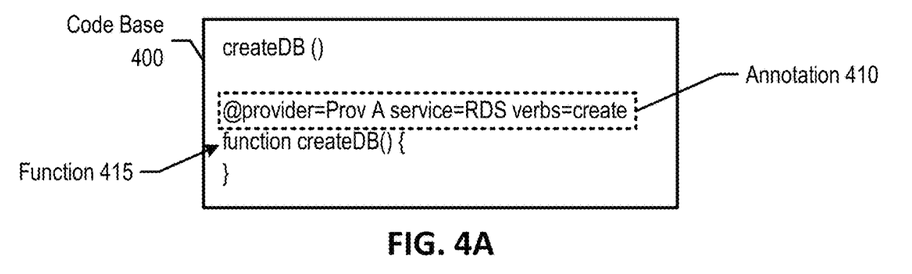
FIGS. 4A-4D are diagrams illustrating various annotation insertions and permission request wrappers, in accordance with some embodiments of the present disclosure.

FIGS. 4A-4D are diagrams illustrating various annotation insertions and permission request wrappers, in accordance with some embodiments of the present disclosure. FIG. 4A is a diagram that illustrates an example of inserting an annotation into a code base (e.g., source code). Code base 400 includes a 'create DB ( )" action and function 415 that calls the create DB action. In some embodiments, annotation 410 is inserted by a developer into code base 400, which compiler 138 identifies and adds a permission wrapper around function 415 to turn on permissions to execute function 415 and then turn off permissions after execution of function (see FIG. 4B and corresponding text for further details).

Figure 4B:
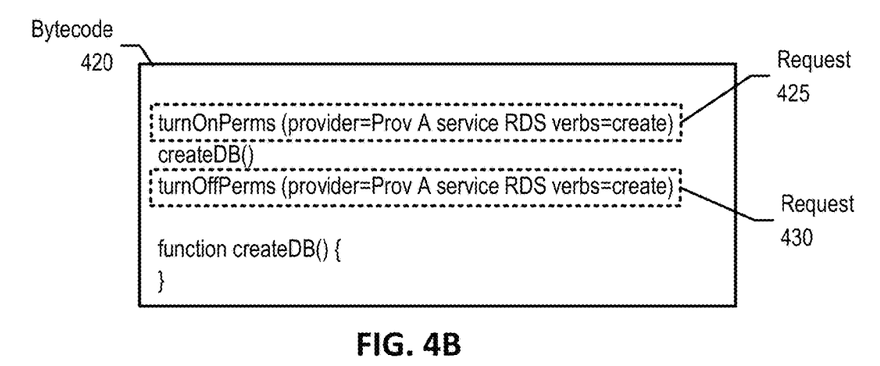

FIG. 4B is a diagram that illustrates an example of byte code (compiled code) generated by a compiler that adds a permission wrapper around a function. When the compiler compiles code base 400, the compiler identifies annotation 410 and adds request 425 before create DB ( ) and adds request 430 after create DB ( ). Request 425 sends a request to trusted RBAC controller 170 to turn on permissions for the container to access a provider (e.g., provider A 230), and request 430 sends a request to trusted RBAC controller 170 to turn off permissions for the container to access a provider (e.g., provider A 230).

Figure 4C:
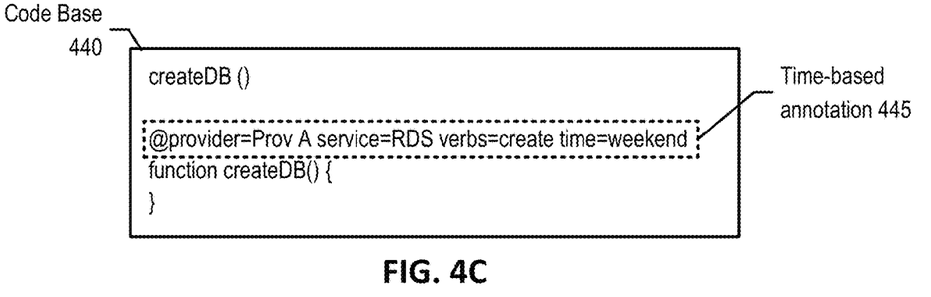

FIG. 4C is a diagram that illustrates an example of inserting a time-based annotation into a code base. Code base 440 includes time-based annotation 445, which instructs the trusted RBAC controller 170 to request resource permission on the weekend. As such, whenever container sends a request to turn on permissions, trusted RBAC controller 170 compares the time-based policy against a current time to determine whether to send a policy request to the resource to allow access by the container.

Figure 4D:
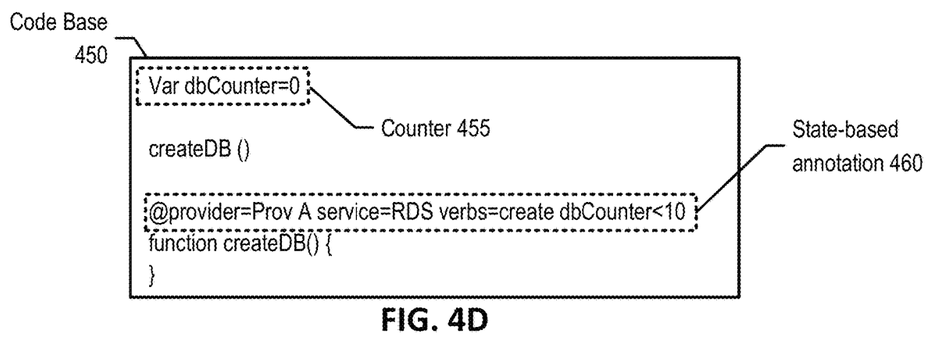

FIG. 4D is a diagram that illustrates an example of inserting a state-based annotation into a code base. Code base 440 includes counter 455 and state-based annotation 460, which instructs the trusted RBAC controller 170 to request resource permission up until the counter is less than 10. As such, whenever the container sends a request to turn on permissions, trusted RBAC controller 170 compares the state-based policy against the counter to determine whether to send a policy request to the resource to allow access by the container.

In some embodiments, when the variable references a local variable, the variable exists in the running program/container and the corresponding program/container tracks the variable count. In some embodiments, the variable may be a simple Boolean true/false value. In some embodiments, the code base may use a keyword such as "rbacCounter" (does not reference a local variable) and trusted RBAC controller 170 recognizes the keyword and starts a count on every request for "rbacCounter" and rejects calls that go beyond the counter limit.

Figure 5:
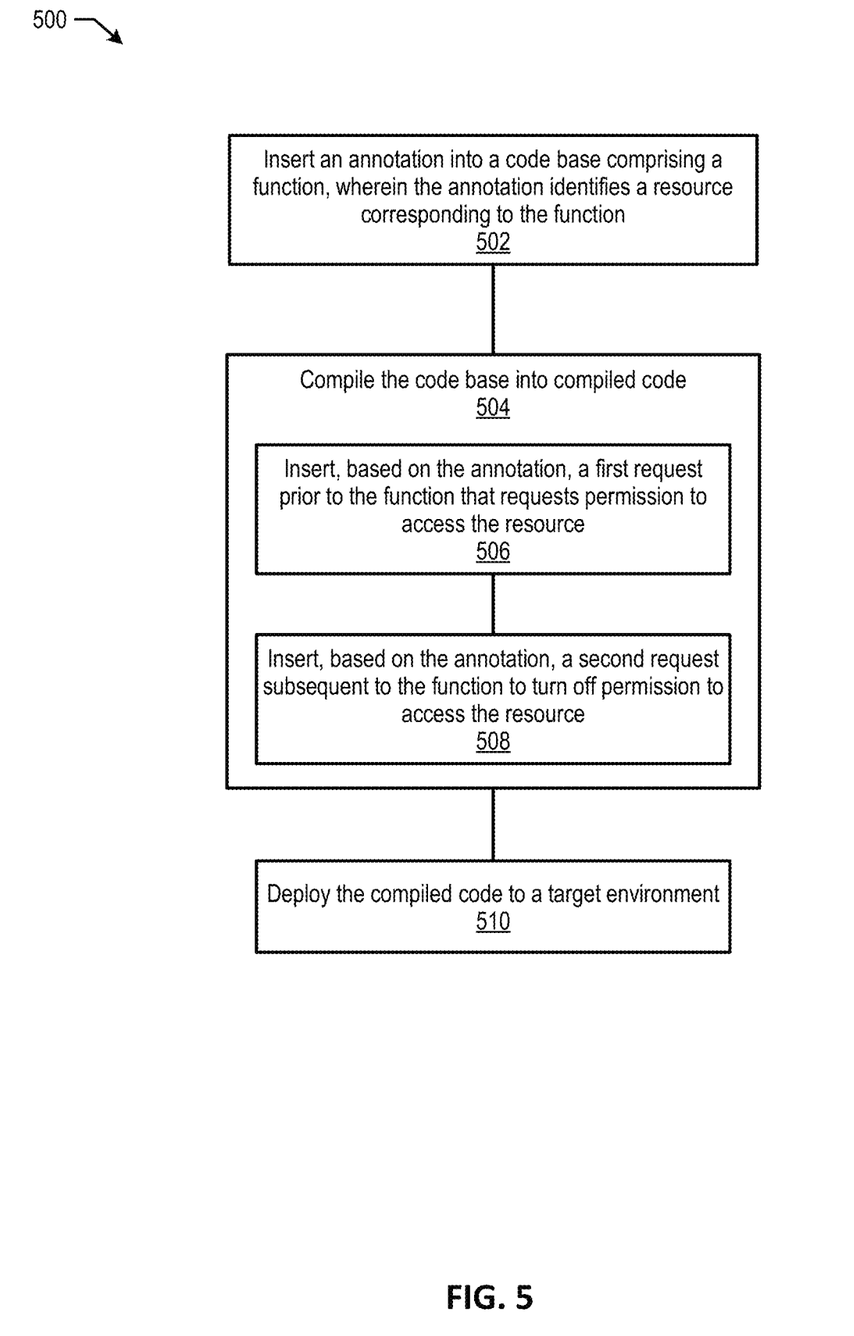
FIG. 5 is a flow diagram of a method of providing a just in time annotation driven role based access control (RBAC) capability, in accordance with some embodiments of the present disclosure.

FIG. 5 is a flow diagram of a method of providing a just in time annotation driven role based access control (RBAC) policy capability, in accordance with some embodiments of the present disclosure. Method 500 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by compiler 138 and processing device 115 shown in FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 502, where processing logic inserts an annotation into a code base that includes a function. The annotation identifies a resource corresponding to the function, such as annotation 202 identifying provider A 230 used by function 203 shown in FIG. 2.

At block 504, the processing logic compiles the code base into compiled code, which includes block 506 and block 508. At block 506, the processing logic inserts, based on the annotation, a first request prior to the function that requests permission to access the resource, such as request 425 shown in FIG. 4B. At block 508, the processing logic inserts, based on the annotation, a second request subsequent to the function to turn off permission to access the resource, such as request 430 shown in FIG. 4B.

At block 510, the process logic deploys the compiled code to a target environment. In one embodiment, the compiled code is deployed as a container, such as container 320 shown in FIG. 2.

Figure 6:
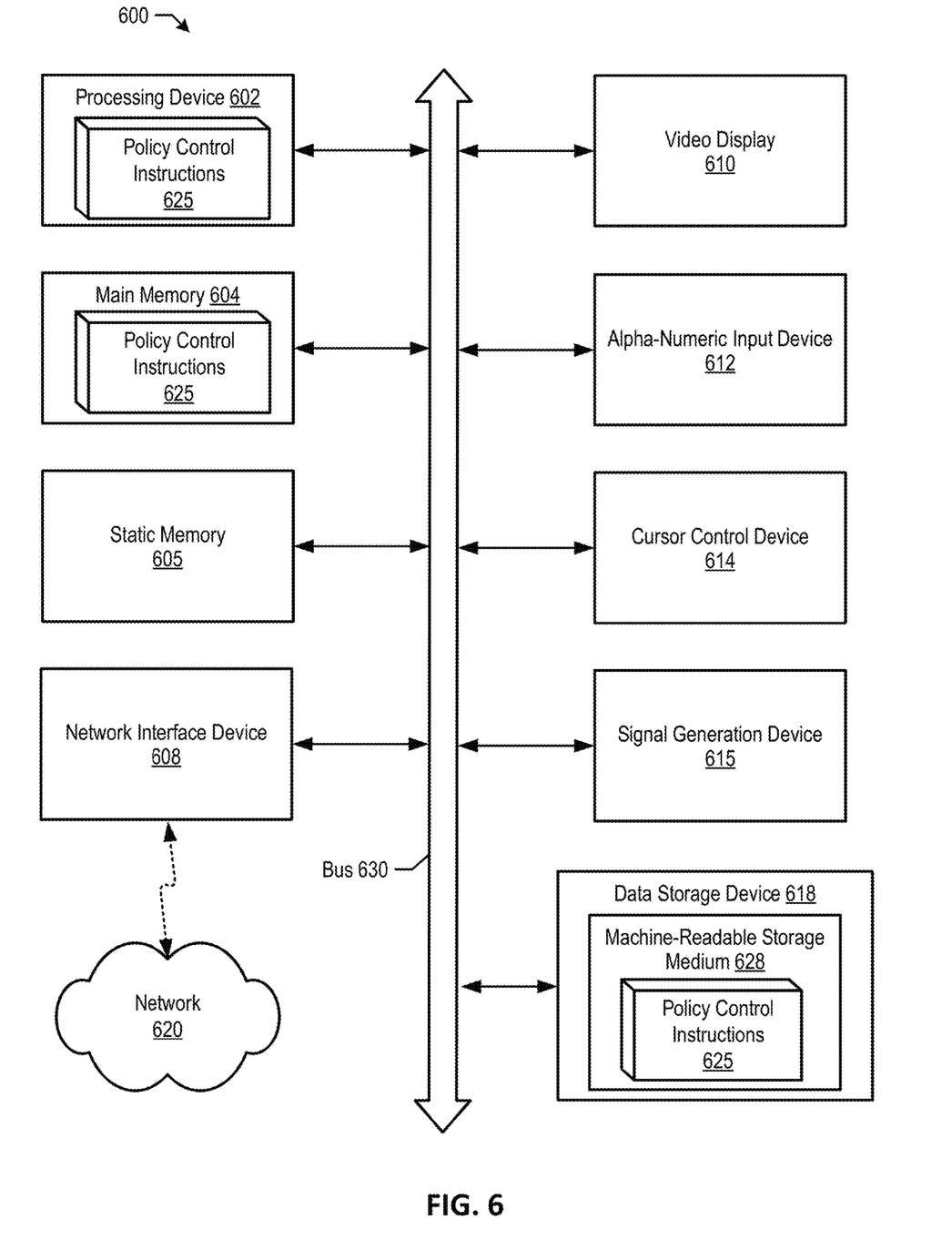
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for intelligently scheduling containers.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, computer system 600 may be representative of a server.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618 which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computer system 600 may further include a network interface device 608 which may communicate with a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In some embodiments, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute annotation driven just in time and state-based RBAC policy control instructions, referred to herein as policy control instructions 625, for performing the operations and steps discussed herein.

The data storage device 618 may include a machine-readable storage medium 628, on which is stored one or more sets of policy control instructions 625 (e.g., software) embodying any one or more of the methodologies of functions described herein. The policy control instructions 625 may also reside, completely or at least partially, within the main memory 604 or within the processing device 602 during execution thereof by the computer system 600; the main memory 604 and the processing device 602 also constituting machine-readable storage media. The policy control instructions 625 may further be transmitted or received over a network 620 via the network interface device 608.

The machine-readable storage medium 628 may also be used to store instructions to perform a method for intelligently scheduling containers, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "inserting," "compiling," "executing," "sending," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and are not to be limited to the details given herein, but may be modified within the scope and equivalents of the appended claims.

What is claimed is:

1. A method comprising:
  inserting an annotation into a code base comprising a function, wherein the annotation comprises a resource identifier that identifies a resource corresponding to the function;
  compiling, by a processing device, the code base into compiled code, wherein, during the compiling, the method further comprises:
    inserting into the code base, based on the annotation, a first request prior to the function that requests permission to access the resource corresponding to the resource identifier; and
    inserting into the code base, based on the annotation, a second request subsequent to the function to turn off permission to access the resource corresponding to the resource identifier;
  deploying the compiled code as a container to a target environment;
  executing the compiled code by the container, wherein, during the executing of the compiled code, the method further comprises:
    sending, from the container, the first request to a trusted controller to request permission for the container to access the resource;
    responsive to receiving the first request at the trusted controller, formatting, by the trusted controller, a first policy request based on a plug-in corresponding to the resource;
    sending the first policy request from the trusted controller to the resource to turn on permission for the container to access the resource;
    responsive to sending the first request, executing, by the container, the function at the resource;
    responsive to executing the function at the resource, sending, from the container, the second request to the trusted controller to turn off permission for the container to access the resource;
    responsive to receiving the second request at the trusted controller, formatting, by the trusted controller, a second policy request based on the plug-in corresponding to the resource; and sending, by the trusted controller to the resource, the second policy request to turn off permission for the container to access the resource.

2. The method of claim 1, further comprising:
responsive to a policy change at the resource, modifying the plug-in at the trusted controller to create a modified plug-in; and
formatting, by the trusted controller, the first policy request and the second policy request based on the modified plug-in.

3. The method of claim 1, wherein the annotation comprises a state-based policy that, during the compiling, the state-based policy is inserted into the first request, the method further comprising:
responsive to receiving the first request that comprises the state-based policy, analyzing, by the trusted controller, the state-based policy against one or more conditions corresponding to the container and the resource; and
inhibiting, by the trusted controller, a policy request to request permission for the container to access the resource based on the analyzing.

4. The method of claim 1, wherein the annotation comprises a time-based policy that, during the compiling, the time-based policy is inserted into the first request, the method further comprising:
responsive to receiving the first request that comprises the time-based policy, analyzing, by the trusted controller, the time-based policy against a current time; and
inhibiting, by the trusted controller, a policy request to request permission for the container to access the resource based on the analyzing.

5. The method of claim 1, further comprising:
creating, by the trusted controller, a historical usage pattern based on historical activity between the container and the resource;
comparing, by the trusted controller, the historical usage pattern against a current usage pattern between the container and the resource; and
generating an alert based on the comparing indicating that a difference between the current usage pattern and the historical usage pattern exceeds a threshold.

6. A system comprising:
a memory; and
a processing device operatively coupled to the memory, the processing device to:
insert an annotation into a code base comprising a function, wherein the annotation comprises a resource identifier that identifies a resource corresponding to the function;
compile, by the processing device, the code base into compiled code, the processing device further to:
insert into the code base, based on the annotation, a first request prior to the function that requests permission to access the resource corresponding to the resource identifier; and
insert into the code base, based on the annotation, a second request subsequent to the function to turn off permission to access the resource corresponding to the resource identifier;
deploy the compiled code as a container to a target environment;
execute the compiled code by the container to:
send, from the container, the first request to a trusted controller to request permission for the container to access the resource;
responsive to receiving the first request at the trusted controller, format, by the trusted controller, a first policy request based on a plug-in corresponding to the resource;
send the first policy request from the trusted controller to the resource to turn on permission for the container to access the resource;
responsive to sending the first request, execute, by the container, the function at the resource;
responsive to executing the function at the resource, send, from the container, the second request to the trusted controller to turn off permission for the container to access the resource;
responsive to receiving the second request at the trusted controller, format, by the trusted controller, a second policy request based on the plug-in corresponding to the resource; and
send, by the trusted controller to the resource, the second policy request to turn off permission for the container to access the resource.

7. The system of claim 6, wherein the trusted controller is further to:
responsive to a policy change at the resource, modify the plug-in at the trusted controller to create a modified plug-in; and
format the first policy request and the second policy request based on the modified plug-in.

8. The system of claim 6, wherein the annotation comprises a state-based policy that, during the compilation, the state-based policy is inserted into the first request, the trusted controller is further to:
responsive to receiving the first request that comprises the state-based policy, analyze the state-based policy against one or more conditions corresponding to the container and the resource; and
inhibit a policy request to request permission for the container to access the resource based on the analysis.

9. The system of claim 6, wherein the annotation comprises a time-based policy that, during the compilation, the time-based policy is inserted into the first request, the trusted controller is further to:
responsive to receiving the first request that comprises the time-based policy, analyze the time-based policy against a current time; and
inhibit a policy request to request permission for the container to access the resource based on the analysis.

10. The system of claim 6, wherein the trusted controller is further to:
create a historical usage pattern based on historical activity between the container and the resource;
compare the historical usage pattern and a current usage pattern of activity between the container and the resource; and
generate an alert based on the comparison indicating that a difference between the current usage pattern and the historical usage pattern exceeds a threshold.

11. A non-transitory computer-readable medium having instructions stored thereon which, when executed by a processing device, cause the processing device to:
insert an annotation into a code base comprising a function, wherein the annotation comprises a resource identifier that identifies a resource corresponding to the function;
compile, by the processing device, the code base into compiled code, the processing device further to:

insert into the code base, based on the annotation, a first request prior to the function that requests permission to access the resource corresponding to the resource identifier; and insert into the code base, based on the annotation, a second request subsequent to the function to turn off permission to access the resource corresponding to the resource identifier;

deploy the compiled code as a container to a target environment;

execute the compiled code by the container to:

send, from the container, the first request to a trusted controller to request permission for the container to access the resource;

responsive to receiving the first request at the trusted controller, format, by the trusted controller, a first policy request based on a plug-in corresponding to the resource;

send the first policy request from the trusted controller to the resource to turn on permission for the container to access the resource;

responsive to sending the first request, execute, by the container, the function at the resource;

responsive to executing the function at the resource, send, from the container, the second request to the trusted controller to turn off permission for the container to access the resource;

responsive to receiving the second request at the trusted controller, format, by the trusted controller, a second policy request based on the plug-in corresponding to the resource; and send, by the trusted controller to the resource, the second policy request to turn off permission for the container to access the resource.

12. The non-transitory computer-readable medium of claim 11, wherein the annotation comprises a state-based policy that, during the compilation, the state-based policy is inserted into the first request, the processing device is further to:

responsive to receiving the first request that comprises the state-based policy, analyze, by the trusted controller, the state-based policy against one or more conditions corresponding to the container and the resource; and inhibit, by the trusted controller, a policy request to request permission for the container to access the resource based on the analysis.

13. The non-transitory computer-readable medium of claim 11, wherein the annotation comprises a time-based policy that, during the compilation, the time-based policy is inserted into the first request, the processing device is further to:

responsive to receiving the first request that comprises the time-based policy, analyze, by the trusted controller, the time-based policy against a current time; and inhibit, by the trusted controller, a policy request to request permission for the container to access the resource based on the analysis.

14. The non-transitory computer-readable medium of claim 11, wherein the processing device is further to:

create, by the trusted controller, a historical usage pattern based on historical activity between the container and the resource;

compare, by the trusted controller, the historical usage pattern against a current usage pattern of activity between the container and the resource; and generate an alert based on the comparison indicating that a difference between the current usage pattern and the historical usage pattern exceeds a threshold.

\* \* \* \* \*